(12) United States Patent
Clayson et al.

(10) Patent No.: US 7,903,265 B2
(45) Date of Patent: Mar. 8, 2011

(54) METHOD FOR MEASURING COATING UNIFORMITY

(75) Inventors: Brian T. Clayson, Ann Arbor, MI (US); Hiroshi Yamanaka, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 270 days.

(21) Appl. No.: 12/098,110

(22) Filed: Apr. 4, 2008

(65) Prior Publication Data
US 2009/0251710 A1   Oct. 8, 2009

(51) Int. Cl.
*G01B 11/28* (2006.01)
(52) U.S. Cl. .................................................. 356/630
(58) Field of Classification Search ........... 356/630–632
See application file for complete search history.

(56) References Cited

U.S. PATENT DOCUMENTS

| | | | |
|---|---|---|---|
| 3,168,784 A | 2/1965 | Morrissey | |
| 3,523,246 A | 8/1970 | Hall et al. | |
| 3,936,665 A | 2/1976 | Donoghue | |
| 4,190,770 A | 2/1980 | Saunders et al. | |
| 4,250,382 A | 2/1981 | Libby | |
| 4,271,477 A | 6/1981 | Williams et al. | |
| 4,351,114 A | 9/1982 | Sigg et al. | |
| 4,434,366 A | 2/1984 | Spongr et al. | |
| 4,441,022 A | 4/1984 | Joffe et al. | |
| 4,535,239 A | 8/1985 | Brighton | |
| 4,957,770 A | 9/1990 | Howarth | |
| 4,972,072 A * | 11/1990 | Hauser et al. | 250/225 |
| 5,091,647 A | 2/1992 | Carduner et al. | |
| 5,099,504 A | 3/1992 | Pettit | |
| 5,229,840 A | 7/1993 | Arnarson et al. | |
| 5,255,302 A | 10/1993 | Shimamune et al. | |
| 5,418,467 A | 5/1995 | Floch et al. | |
| 5,455,422 A | 10/1995 | Anderson et al. | |
| 5,504,794 A | 4/1996 | Campas et al. | |
| 5,861,946 A | 1/1999 | Hudson et al. | |
| 6,050,139 A | 4/2000 | Bousfield et al. | |
| 6,074,483 A | 6/2000 | Belotserkovsky et al. | |
| 6,252,237 B1 | 6/2001 | Ramthun et al. | |
| 6,363,787 B1 | 4/2002 | Carlson et al. | |
| 6,620,246 B2 * | 9/2003 | Alaimo et al. | 118/681 |
| 6,757,069 B2 * | 6/2004 | Bowles | 356/630 |
| 2003/0116881 A1 | 6/2003 | Nelson et al. | |
| 2008/0182008 A1 * | 7/2008 | Snow et al. | 427/8 |

* cited by examiner

*Primary Examiner* — Michael P Stafira
(74) *Attorney, Agent, or Firm* — Gifford, Krass, Sprinkle, Anderson & Citkowski, P.C.

(57) ABSTRACT

A method of determining thickness uniformity of a coating, the coating being formed on the surface of an object, the method comprising determining coating thickness data within portions of the surface, the portions including at least one generally concave portion and at least one generally convex portion, and presenting the coating thickness data as a graphical representation for each portion.

18 Claims, 6 Drawing Sheets

METHOD FOR MEASURING COATING UNIFORMITY

FIELD OF THE INVENTION

The invention relates to coatings, in particular improved methods revealing issues related to coating uniformity.

BACKGROUND OF THE INVENTION

Many objects, such as fasteners including bolts and the like, are provided with a coating. For example, bolts may be provided with an anti-corrosion coating. Conventionally, measurements of coating thickness may be made at one or more random locations on the surface of the bolt, and the bolt rejected if there is excessive variation of coating uniformity, or other desired parameter is not in range. However, conventional approaches fail to provide a simple visual presentation of uniformity data, and further do not provide guidance to the source of non-uniformity.

SUMMARY OF THE INVENTION

A method of determining thickness uniformity of a coating formed on the surface of an object comprises determining coating thickness data within a plurality of portions of the surface, the portions including at least one generally concave portion and at least one generally convex portion, determining coating thickness data for each of the plurality of portions, and presenting the coating thickness data as a visual representation for each portion. In some examples, a cross-section of the object is obtained, the portions being two-dimensional portions of a periphery of the cross-section. In other examples, the portions may include curved planes from the surface.

In some examples, a cross-section of the object is obtained, allowing the coating thickness to be obtained from observation of the cross-section through the coating, for example, microscopy (such as optical microscopy or electron microscopy) may be used. The portions are selected from the periphery of the cross-section. For example, coating thickness data may be obtained at intervals around the periphery, and then grouped according to designated portions. In this context, division into portions relates to the grouping of coating thickness data, and no physical division is necessary (unless, e.g. appropriate for a coating thickness determination method).

A cross-section may be obtained having a top section, an end section, and opposed sides. The portions may be chosen so as to include generally convex portions from each of the opposed sides, and generally concave portions from each of the opposed sides. In some examples, the sides may be generally symmetrical about an axis of elongation. For examples, fasteners (such as bolts, screws, rivets, nails, and the like) generally are elongated around a central axis of the fastener (neglecting any minor symmetry breaking effects of a helical thread). In such cases, it would normally be expected that coating thickness data need only be collected from one side of the fastener. Surprisingly, in some experiments, it was found that collecting coating thickness data from opposed sides of a cross-section of the fastener revealed systemic variations in coating thickness. In some cases, the coating thickness was generally thicker on one side of a coated bolt than another.

Systemic variations in coating thickness may arise from physical effects during the coating process. For example, gravitational effects may cause area of the surface that were physically lower during a coating process, and/or recessed, to have thicker coatings. Similarly, areas that were physically higher during a coating process, and/or protruding, may have a lower coating thickness. Typically, a portion that includes all or part of a recess is generally concave, and a portion that includes all or part of a protrusion is generally convex. Portions may be chosen to include all or part of a recess, protrusion, or generally planar surface area.

In some examples of the present invention, a visual representation is made of the coating thickness, such as a graphical representation. A graphical representation may include an indication of median and interquartile range (the difference between 25th percentile and 75th percentile data), and for example may be a box plot.

Examples of the present invention may be used to characterize coating thickness data for any coated object, for example a fastener such as a bolt, screw, nail, tack, pin, peg, rivet, stud, clamp, clip, snap, and the like. The coating may be an anticorrosion coating, paint, electroplated layer, other plated layer, anodized layer, other oxide layer, enamel layer, antireflection layer, friction modifying layer, powder coating, plastic film, or other coating applied to a part.

A further example method of determining thickness uniformity of an anticorrosion coating formed on the surface of a fastener comprises dividing the surface of the fastener into portions, preferably including at least one of: a generally concave portion, a generally convex portion, and a generally planar portion. Coating thickness data are obtained, and grouped according to which portion they are from. Coating thickness data are presented as a graphical representation representing each portion, such as a box plot or other graphical representation showing a distributional peak value or median, and an indication of distributional width (such as an interquartile range) for the coating thickness data. No specific distribution function need be assumed. The distributional width may be indicated by 25th and 75th percentile values, or as a representation of their difference. Thickness data may be grouped within thickness intervals, grouping thickness data within thickness intervals, the thickness intervals having an increment of between approximately 1 micron and approximately 10 microns. The increment is preferably less than the lowest expected value of coating thickness. For example, for some anticorrosion coatings the thickness data may be grouped into thickness ranges (intervals) having increments of approximately 5 microns.

In some examples of the present invention, a coated object may have a central axis, such as the central axis of a screw or bolt, which may be an axis of elongation, and the portions selected from a cross-section made through the central axis.

Hence, a method of determining thickness uniformity of a coating comprises determining coating thickness at intervals around the periphery of the object, grouping coating thickness data for selected portions of the periphery of the object, and presenting the coating thickness data as a graphical representation for each portion, the graphical representation showing a distributional median and a distributional width. The portions may be selected to identify a coating thickness correlation with a surface curvature, for example through choice of recessed or protruding portions. The portions may include at least one generally concave portion, at least one generally convex portion, and at least one generally planar portion. In the case of an anticorrosion coating on a metal fastener, coating thickness measurements may be made at intervals of between approximately 50 microns and approximately 1 mm.

DETAILED DESCRIPTION OF THE PREFERRED EMBODIMENTS

Mechanical items, such as fasteners and in a particular example bolts, are often provided with surface coatings. The surface coating may be chosen to provide a particular advantageous property, such as corrosion resistance. Ideally, the surface coating is generally uniform. However, due to manufacturing variations or other causes, a non-uniform coating may be obtained. In the example of anti-corrosion coatings, thin regions may be associated with future corrosion problems. Also, regions of excessively thick coating may compromise desired mechanical tolerances. For example, accumulation of coating material in recesses may impede mechanical engagement, and may compromise corrosion protection if this causes a coating to flake off. Other problems may arise as will be clear to those skilled in the art.

For example, the orientation of a mechanical item prior to or during application of a coating may cause systemic variations in coating thickness. These systemic variations may not be detected if random measurements are made on a surface. For example, anti-corrosion application to some bolts is applied with the bolt in a horizontal orientation, i.e. the direction of elongation of the bolt being horizontal. In such cases, the coating thickness on higher portions of the mechanical item may be thinner than within lower portions. Also recesses within the lower portions may be subject to accumulation of a coating material. These systemic variations may be undetected with a random sampling of coating thickness measurements over the surface of the mechanical item. Random spot checks may not identify underlying causes of coating problems. Hence improved methods of measuring and visual presentation of coating thickness are highly desirable, for example to improve manufacturing processes and the reliability of coated parts. In examples of the present invention, measurements of coating thickness are made in selected regions of the surface, so as to reveal uniformity problems, and further to reveal physical origins of uniformity problems, allowing such problems to be solved in a systemic manner.

Figure 1:
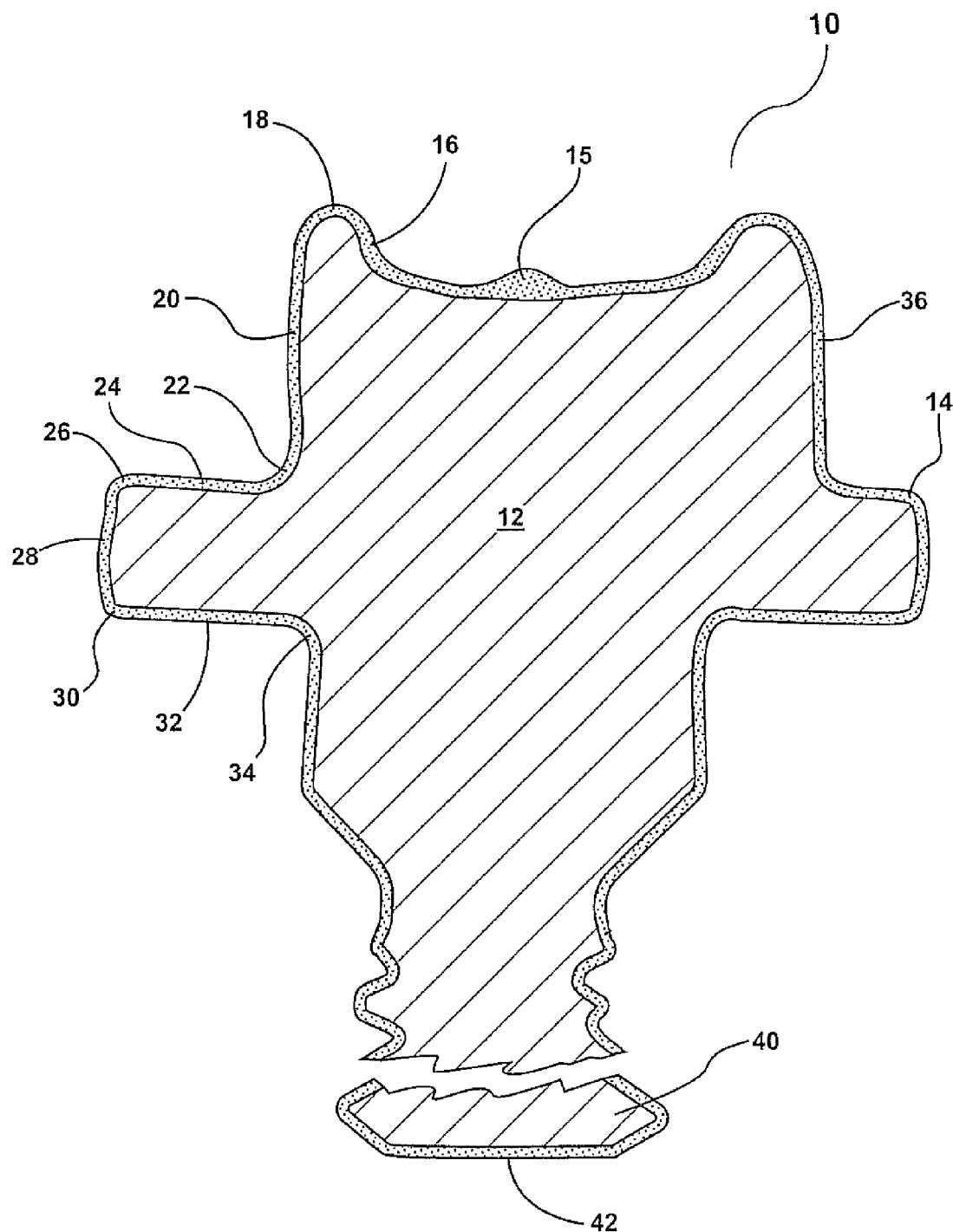
FIG. 1 shows a bolt in cross section, having a number of concave, convex, and substantially planar surfaces, and a coating provided thereon.

FIG. 1 shows a cross-section of a head section of a bolt, also showing the upper part of a threaded section. The bolt shown generally at 10 comprises a metal head section 12 and a coating 14 extending over the surface of the bolt. FIG. 1 is a cross section, and the thickness of the coating is exaggerated, e.g. as compared with typical anti-corrosion coating thicknesses, for visual clarity. The periphery of the bolt includes portions having different geometric properties. For example, the top surface 15 of the bolt is generally planar whereas the upper portion 18 is generally convex.

Ideally the coating has a desired thickness around the entire periphery of the bolt. Ideally, the coating thickness does not vary significantly from one side to the other, from top to bottom, or through other variations, such as concave as opposed to convex and/or planar regions of the surface.

In FIG. 1, the bolt's exterior periphery may be divided into portions, such as portions having the following properties.

Planar portions, or generally planar portions, include generally planar areas such as 15, 20, 24, 28, and 32. Generally concave portions may include concave areas such as those shown at 16, 22, and 34. Generally convex portions may include convex areas are shown at 18, 26, and 30. For example, a generally concave portion may include one or more concave areas and a planar area.

In some examples of the present invention, thicknesses are compared within concave, convex, and/or generally planar portions so as to investigate the effect of surface curvature on coating thickness.

In further examples of the present invention, the effect of part orientation is investigated through comparison of coating thicknesses within regions selected to reveal the effects of such part orientation. For example, if the bolt shown in FIG. 1 is coated with the bolt in the shown orientation, which may be denoted a vertical orientation, it may be expected that coating thicknesses may be greater in lower portions of the surface, due to the effect of gravity. Also, pooling of coating material in depressions such as 15 may be expected. For such orientations, it may be necessary to sample coating thicknesses within portions chosen with regard to surface curvature and relative height within the part, for the orientation shown.

In other examples of the present invention, a part may be coated in a generally horizontal orientation. For example, the bolt shown in FIG. 1 may be expected to have generally cylindrical symmetry so that the coating thickness at a position such as 20 may be expected to be similar to the coating thickness of other points around a cross section of the bolt such as a point 36. However, in some coating processes, the bolt may be held in a generally horizontal orientation. In such examples, for example point 36 as shown will be physically higher than point 20. Hence, coating thicknesses at 36 may be expected to be thinner than coating thicknesses at 20, for example due to the effect of gravitational forces, flow of the coating around the mechanical part, and the like. The end part of the threaded section is shown at 40, having coating 42.

In such examples, an improved method of investigating coating thickness uniformity includes obtaining a series of thickness measurements. Coating thickness measurements may be made within representative planar, generally concave, and generally convex portions of the bolt surfaces for cross sections corresponding to the highest and lowest points of the bolt as it was coated.

The periphery of an object can be divided into a plurality of portions, for example generally planar portions, generally concave portions, and generally convex portions. A substantially concave portion may include a concave area and a generally planar area. A generally convex portion may include a convex area and a substantially planar area. However, concave and convex areas are preferably not included in the same portion.

Conventionally, coating thickness measurements may be obtained at various random positions over the bolt surface. Such conventional thickness measurements may give some evidence of coating non-uniformity, but no information regarding underlying problems. Further a series of random numbers provides a poor visual representation of uniformity problems, so that a person may have difficulty interpreting the measurements.

An example approach is now described. However it should be understood that this example is illustrative and is not limiting to the invention.

Figure 2A:
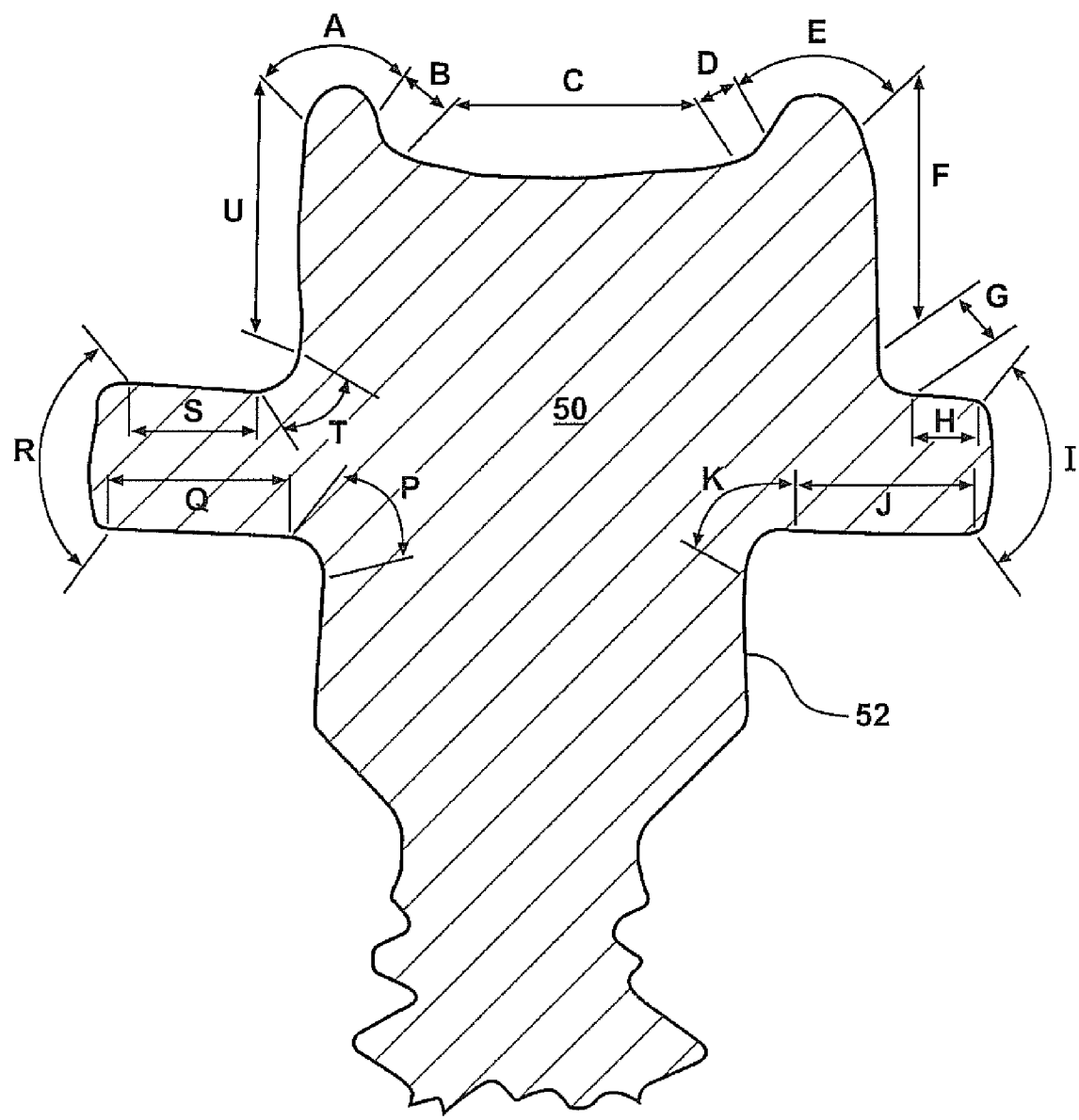
FIG. 2A shows a bolt in cross section, in which a peripheral surface perimeter is divided into a plurality of portions.

FIG. 2A shows a cross section of a bolt, similar to that shown in FIG. 1. The figure shows the head section, which is unthreaded. In this example the surface periphery is divided into a number of portions indicated by letters A-K and P-U. In an example approach, a coating thickness measurement is made every 200 microns around the edge of the bolt, and the surface thickness measurements are divided into categories based upon the portions shown in FIG. 2A. FIG. 2A is generally restricted to the head portion of the bolt; however a similar approach can be used with the threaded portion. For example if a portion is approximately 1000 microns long, then approximately five surface thickness measurements are made within that portion. However this is an example approach, and for example the number of measurements may be made approximately the same for each portion, even if this corresponds to a larger measurement interval between each surface thickness measurement.

Optionally, coating thickness measurements are grouped together using increments of 5 microns, or other appropriate division. For example thickness measurements may be recorded as being within ranges such as 0 to 5, 5 to 10, 10 to 15, and 15 to 20 microns thickness. For example portion A may have 6 measurements in the 0 to 5 range, 4 in the 5 to 10 range, and 16 in the 10 to 15 range.

After all thickness data has been collected, a visual representation of the thickness measurements is created for each portion. The visual representation includes one or more of the following parameters: mean−standard deviation, $25^{th}$ percentile, $50^{th}$ percentile, mean and mean error bars, $75^{th}$ percentile, mean+standard deviation, and maximum and minimum data points excluding outliers. In this context, outliers correspond to thickness measurement data that fall outside of an expected distribution of measurements. Preferably, the visual representation includes at least the $25^{th}$, $50^{th}$ and $75^{th}$ percentiles, as well as the maximum and minimum data points. Such a visual representation allows a person to quickly visualize the range of data, facilitating quality review. Embodiments of the present invention allow coating uniformity to be quantified in an effective manner, and visually represented in a manner that helps quality monitoring. In representative experiments using a described approach, it was rapidly able to determine which areas of the bolt had lower or less uniform coating thickness. The problematic coating areas could then be isolated for enhanced review, and problem identification. Referring again to FIG. 2A, the selection of indicated portions allows systemic errors to be rapidly identified. For example corresponding portions along a vertical axis of symmetry, such as U and F, may be expected to have similar properties. However if U and F are significantly different, a breakdown in cylindrical symmetry is indicated. In specific experiments, it was identified that problems in coating uniformity could arise through the bolt being coated in a generally horizontal orientation. In this configuration portion F may lie at the top of the bolt as it is oriented during coating and portion U may lie at the bottom of the bolt. In such coating orientations, the thickness of the coating within portion U may be significantly greater than the thickness within portion F.

If the bolt is coated in the orientation shown, portions S and H may be expected to have similar coating thickness properties. However, a generally planar portion such as S that faces upwards may be expected to have a thicker coating than a portion such as Q, which is a generally planar portion facing downwards.

Similarly, the division of the periphery into generally convex, concave, and planar portions allows the effects of surface curvature on thickness coating uniformity to be investigated. For example if a coating is of low viscosity, it may be expected to pool within recesses, such as generally concave portions such as T, and within the valleys of threaded regions for example as discussed in relation to FIGS. 3 and 4. If a coating is applied through a spray method or through powder deposition, it may be expected that coating thicknesses may be influenced by shadowing effects. Hence, surface portions may be selected to obtain data indicative of such underlying problems.

Figure 2B:
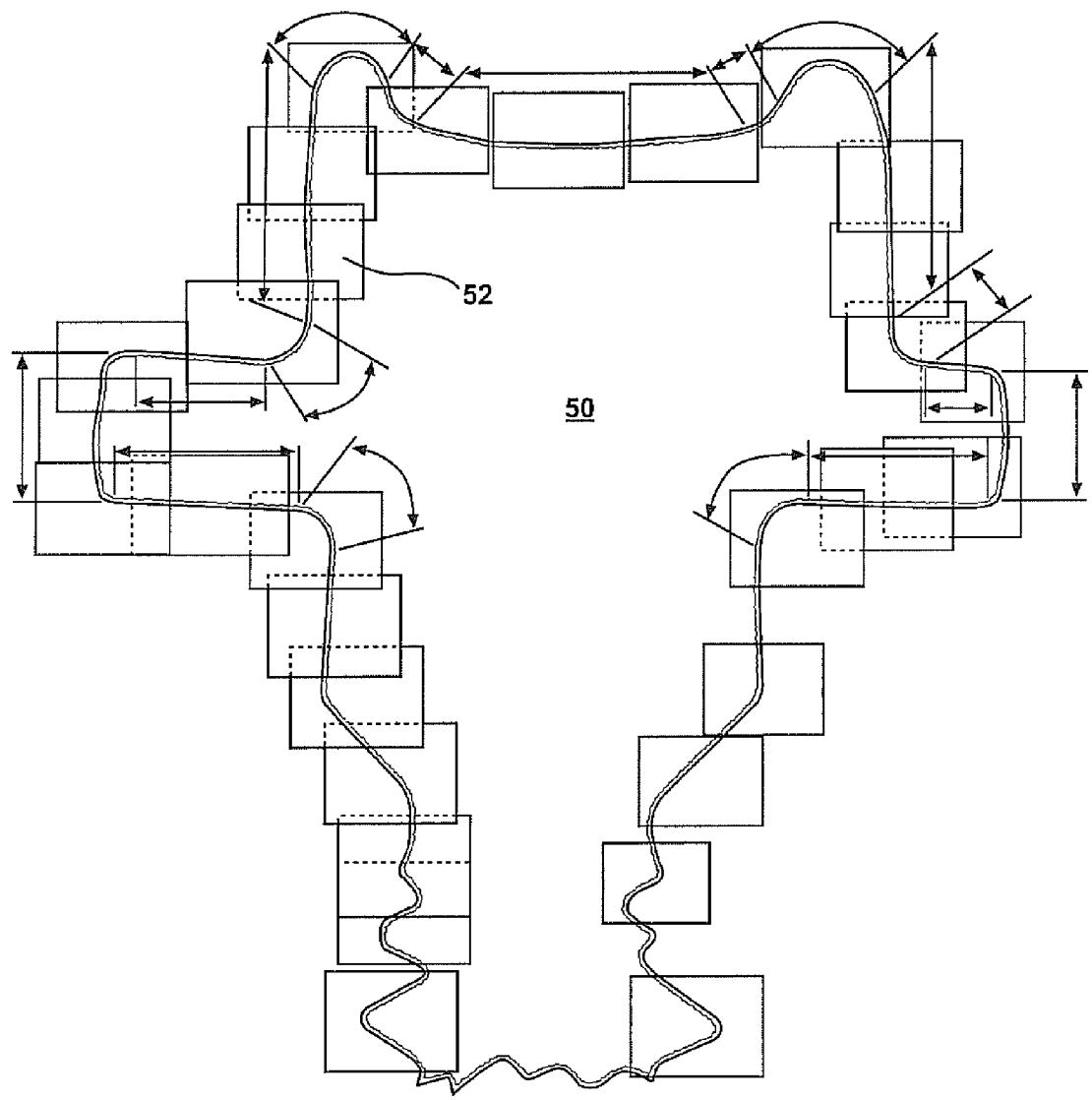
FIG. 2B shows a bolt in cross-section, along with optical micrographs.

FIG. 2B is similar to FIG. 2A, and shows optical micrographs such as 52 taken of the cross-section of a bolt 50. Coating thickness may be determined from the cross-section through the coating.

Coating thickness may also be determined over the threaded area of a threaded fastener. In some examples, measurements are taken from representative parts of the threaded area, for example valleys and peaks (e.g. see FIG. 3, discussed below) for threaded areas near the ends and middle of the threaded area.

Figure 3:
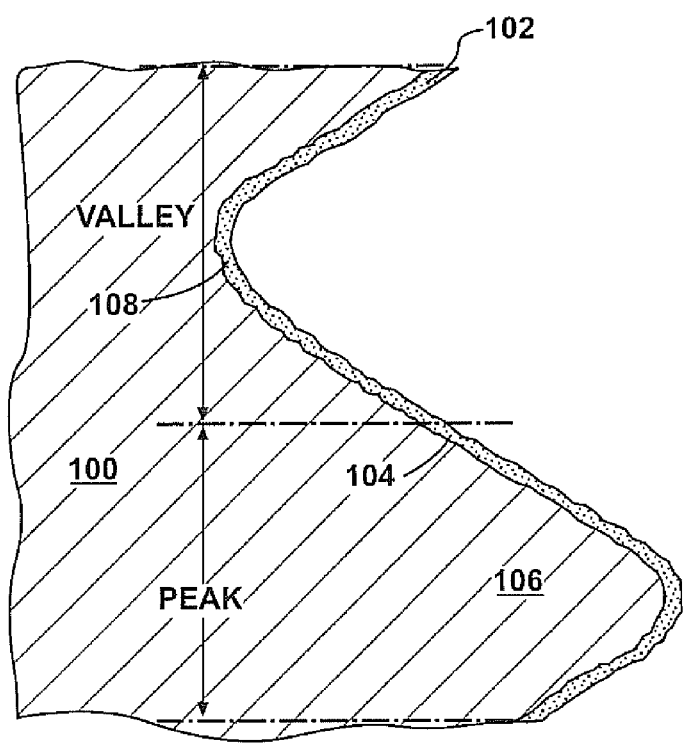
FIG. 3 is an optical micrographs of a valley and peak within the threaded section of a coated bolt.

FIG. 3 is an optical micrograph showing a valley and peak within a threaded portion of a coated bolt. The bolt body is shown generally at 100, the coating is shown at 102, having thicker areas such as 104. The threaded section shown has a peak 106 and a valley 108.

Figure 4:
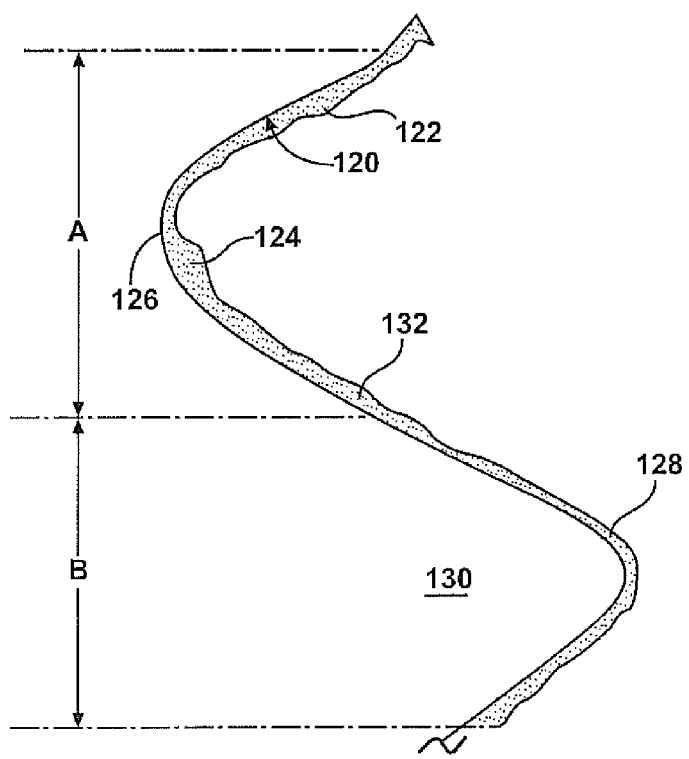
FIG. 4 is a graphical representation of a similar peak and valley to FIG. 3.

FIG. 4 is a graphical representation of a similar peak and valley within a threaded bolt portion, similar to that shown in FIG. 3. FIG. 4 shows a coating 122 on surface 120 of the bolt. In this example, the coating thickness at 124 close to a valley 126 is somewhat thicker than the coating thickness at 128 close to a peak 130. In this example, thickness measurements may be obtained from a pair of portions denoted 'A' and 'B'.

In this example, 'A' represents a generally concave portion of the bolt surface, whereas 'B' represents a generally convex surface of the bolt surface.

In other examples, representative areas of a threaded section (if present within the coated object) may be divided into concave, convex and substantially planar portions. A substantially planar portion may include thickness measurements around a point such as 132 within the substantially planar portion between the peak 128 and the valley 126. In further examples, a substantially planar portion may correspond to a planar area having a generally top left to bottom right orientation, as illustrated, for example around point 132, and/or substantially planar regions having a top right to bottom left orientation, for example around a point such as 122. By grouping the coating thickness data within such designated portions, systemic problems in coating uniformity may be identified.

Figure 5:
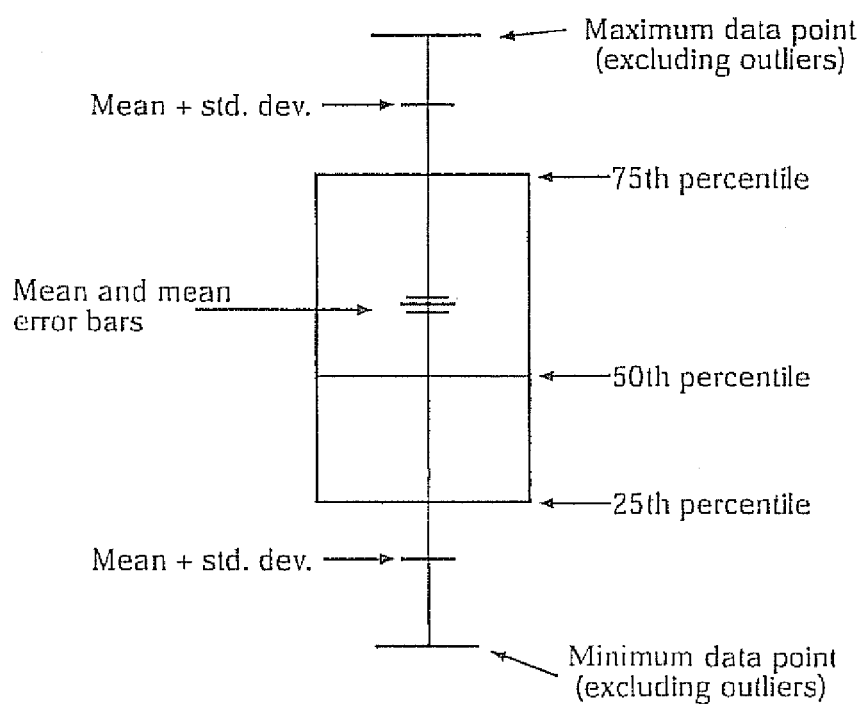
FIG. 5 shows a box plot suitable for visual presentation of coating thickness data.

FIG. 5 is a representative box plot which may be used for visual presentation of coating thickness data. The box plot shows the value of minimum data point excluding outliers, the $25^{th}$ percentile, the $50^{th}$ percentile, the $75^{th}$ percentile, and the maximum data point excluding outliers. Also shown are the mean, the error bars on the mean, the mean plus 1 standard deviation, and the mean minus one standard deviation. This particular visual representation was found to allow rapid evaluation of coating thickness problems.

Examples of the present invention are not restricted to coatings of bolts. Examples may also relate to other fasteners, other coated hardware, and other surface treated materials.

Hence an improved method of determining surface thickness uniformity includes dividing the surface into a plurality of portions, the portions including at least two of the following: a generally planar portion, a generally convex portion, and a generally concave portion. Thickness data is then determined for each portion.

Then, visual presentation of thickness data is provided using a graphical representation such as a data plot. The data plot preferably includes at least one of the following: a mean, a median, or a $50^{th}$ percentile measurement. The data plot further includes at least one of the following: an estimated deviation, a standard deviation, an error bar, and $25^{th}$ and $75^{th}$ percentiles. The data plot may further include the maximum and minimum data obtained, optionally excluding outliers. In some examples of the present invention, coating thicknesses are obtained using a cross section of the mechanical part. The cross section defines first and second generally opposed sides of the mechanical part. The first and second sides may have different average positions, referenced to a reference plane, during the coating process. For example, in the case of a bolt, a first side of the bolt may have been uppermost during a coating process, the second (opposed) side being in a lowermost position. If the coating is obtained from a spray nozzle, the cross section may be selected so as to reveal information related to shadowing effects.

In some examples, coating thicknesses are only obtained from one side of the cross section. Such examples include cases where cylindrical symmetry of the coating may be expected (neglecting the helical nature of the threaded section if any). In other examples, this may correspond to other effects dominating any compromise of the cylindrical symmetry. For example if a coating is applied to a bolt with the head in an uppermost or lowermost position relative to the threaded portion, measurements may be made at different heights above a reference plane, such as a support, used during the coating process.

Embodiments of the present invention include methods for determining the coating uniformity of a bolt. In a particular example, the coating thickness is measured every 200 microns around the edge of the bolt. The thickness measurements are then further divided into ranges, for example by grouping the coating thickness measurements within each portion into ranges having thickness increments of 5 microns. A data set is obtained by grouping thickness data relating to a selected portion, and analyzed to create a data plots (such as a box plot) for each portion. A visual representation of the data may be presented, showing the 25th, 50th and 75th percentiles for thickness, as well as the maximum and minimum data points to provide a visual representation of the range of the data. Thickness data are identified with respect to each portion, to determine whether there were problematic coating areas upon the object.

Coating Thickness Determination

Coating thickness measurements may be determined using any appropriate technique. For example, optical microscopy of a sectioned part may be used to determine the coating thickness.

Coating thickness determination methods may include electrical property determination (such as capacitance, inductance, resistance), magnetic properties (such as permeability), electromagnetic properties (such as optical or IR properties, including absorption, reflection, emission, interference, and the like), ionizing radiation methods, (such as X-ray, gamma ray, or beta radiation measurements), and imaging methods (such as microscopy).

Surface Area Portions

In embodiments of the present invention, an object surface is divided into different portions, and coating thickness data are obtained from each portion. For example, coating thickness measurements may be made at intervals along the coating, and then grouped by portion. For example, coating thickness measurements may be made at intervals such as 10 micron–1 mm, more particularly 50 microns–500 microns, along the surface of the object, for example in increments of 200 microns. Coating thickness measurements in each portion are optionally further grouped in thickness ranges having an increment. The increment size may be correlated with the desired coating thickness, for example less than the minimum acceptable thickness. In some examples, the increment may be 5 microns, for example grouping thickness data into ranges<5 microns, 5–<10, 10–<15, and so on. The coating thickness measurements from a selected portion of the surface area are collected into a data set, and the data set is analyzed to create a box plot. The box plots for each portion provides a user with a visual range of data and with the uniformity of thickness of the coating of the object. The increment may be chosen so as to be less than a minimum acceptable thickness of the coating.

For a threaded bolt, it may not be necessary to collect data from all peaks and valleys of the threaded region. A representative sample of peaks and valleys may be studied.

In the example shown in FIG. 2, a cross-section is used to obtain a peripheral surface supporting a coating. The portions (as shown) are generally two-dimensional, corresponding to lines along the surface. In other examples, portions may be three dimensional. For example, a first portion may include a protrusion, and include a convex area. A second portion may include a recess, and be generally concave. A third portion may be substantially planar.

Visual Representation

In examples of the present invention, a box plot is used to present thickness variations. However, other approaches may be used. For example, a combination of graphical representation and/or colors may be used to indicate a range of thicknesses and/or data variability. A visual representation may include a representation of the part, divided up into portions, and data plots proximate to the portions that they represent.

In some examples of the present invention, box plots are used to allow visual comparison of coating thickness data from different portions of an object surface. In an example box plot, a data set is obtained for a coating thickness within a selected portion of the object surface. The data can be taken at intervals (for example using at intervals along a line through the portion (such as a regular spacing along a line), as an array of measurement points, or in any manner desired. The first quartile (25th percentile), median (50th percentile), and third quartile (75th percentile) are determined for coating thickness data obtained from the selected portion of the object. A box may be then be drawn having opposed sides bounded by the 25th percentile and 75th percentile, which are upper and lower box sides for a vertical orientation of a box plot. Box plots may be prepared using statistical software, such as Excel (Microsoft Corp; Redmond, Wash.), JMP (SAS, Cary, N.C.), or other software, and may also be prepared with a horizontal orientation. A line or other symbol within the box can be used to show the median. Optionally, the mean value and standard deviation can also be shown. Outliers, for example data more than some multiple (e.g. 1.5, 2, or 3) times the difference between the 25th percentile and the 75th percentile (the interquartile range) outside the box can be omitted from the analysis. The highest and lowest values, excluding outliers, can be shown, for example as points or lines, and a line or other indication may be used to join the highest and lowest values to the box.

Box plots can be arranged around a representation of the coated part, or be connected by an indicated arrow to a visual representation of the portion of the part that they represent. Alternatively, box plots can be labeled according to the portion of the part that they represent.

Coated Parts

Examples discussed above specifically relate to coated bolts. However, these examples do not limit the invention, which may relate to the coating thickness of any coated object.

Example objects include fasteners (such as bolts, screws, nails, rivets, and the like), hinges, brackets, panels, and the like.

Coatings

Coatings may include anti-corrosion coatings, decorative coatings, optical coatings, and coatings intended to modify one or more chemical, physical, electrical, magnetic property or combination thereof. A coating may have more than one function from those mentioned above, and/or additional functions.

In representative examples of the present invention, coating uniformity of an anti-corrosion coating was investigated on a bolt. Anti-corrosion coatings include coatings comprising metal flakes within an inorganic binder, such as Geomet™ coatings (Metal Coatings International Inc., Chardon, Ohio). Such coatings may be applied using a coating—bake process, for example two coating steps, each coating step followed by a bake step.

In some examples of the present invention, a coating may not be homogeneous. For example, a coating may comprise an anti-corrosion layer and an outer sealant layer. In other examples, coating thickness may relate to the thickness to a particular layer of interest near the surface of a part.

Hence, a method of determining thickness uniformity of a coating, such as an anticorrosion coating formed on the surface of an object, comprises obtaining coating thickness data from portions of the object surface, the portions including a generally concave portion, a generally convex portion, and a generally planar portion, grouping the coating thickness data into data sets for each portion, and presenting a graphical representation, such as a box plot, for each data set, the graphical representation indicating a median value and a degree of variability for the coating thickness.

The invention is not restricted to the illustrative examples described above. Examples described are exemplary, and are not intended to limit the scope of the invention. Changes therein, other combinations of elements, and other uses will occur to those skilled in the art. The scope of the invention is defined by the scope of the claims.

Having described our invention, we claim:

1. A method of determining thickness uniformity of a coating, the coating being formed on the surface of an object, the method comprising:
   determining coating thickness data within portions of the surface, the portions including at least one generally concave portion and at least one generally convex portion; and
   presenting the coating thickness data as a graphical representation for each portion,
   the graphical representation for each portion indicating a median value of coating thickness, and a degree of variability of coating thickness within the portion.

2. The method of claim 1, wherein dividing the object into a plurality of portions includes obtaining a cross-section of the object, the portions being portions of a periphery of the cross-section.

3. The method of claim 2, the cross-section having a top, an end, and a pair of opposed sides, the portions including generally convex portions from each of the opposed sides, and generally concave portions from each of the opposed sides.

4. The method of claim 1, the portions further including at least one generally planar portion.

5. The method of claim 1, the graphical representation being a box plot, the degree of variability being represented by 25th percentile and 75 percentile values.

6. The method of claim 1, coating thickness data being determined at intervals over the surface of the object, coating thickness data being grouped for each portion.

7. The method of claim 1, the object being a metal fastener.

8. The method of claim 7, the metal fastener being a bolt or screw, the coating being an anticorrosion coating.

9. A method of determining thickness uniformity of a coating formed on a surface of an object, the method comprising:
   obtaining coating thickness data from portions of the object surface, the portions including a generally concave portion, a generally convex portion, and a generally planar portion,
   grouping the coating thickness data into data sets for each portion,
   presenting a graphical representation for each data set, the graphical representation indicating a median value and a degree of variability for the coating thickness.

10. The method of claim 9, the degree of variability being indicated by 25th and 75th percentile values.

11. The method of claim 9, the method further comprising grouping thickness data within thickness intervals.

12. The method of claim 11, wherein the thickness intervals have increments of approximately 5 microns.

13. The method of claim 12, the object having an axis of elongation, the portions being selected from a cross-section of the object, the portions being chosen from each side of the axis of elongation.

14. A method of determining thickness uniformity of a coating, the coating being an anticorrosion coating formed on the surface of an object, the object being a metal fastener, the method comprising:
   determining coating thickness at intervals around the periphery of the object,
   grouping coating thickness data for portions of the periphery of the object, portions being selected to identify a coating thickness correlation with a surface curvature,
   presenting the coating thickness data as a graphical representation for each portion, the graphical representation showing a median and a distributional width.

15. The method of claim 14, the portions including at least one generally concave portion, at least one generally convex portion, and at least one generally planar portion.

16. The method of claim 15, the intervals being between approximately 50 microns and approximately 1 mm.

17. The method of claim 14, the method further comprising grouping thickness data within thickness intervals, the thickness intervals having an increment of between approximately 1 micron and approximately 10 microns.

18. The method of claim 17, the thickness intervals having an increment of approximately 5 microns.

* * * * *

UNITED STATES PATENT AND TRADEMARK OFFICE
CERTIFICATE OF CORRECTION

Page 1 of 1

PATENT NO.       : 7,903,265 B2
APPLICATION NO.  : 12/098110
DATED            : March 8, 2011
INVENTOR(S)      : Brian T. Clayson et al.

It is certified that error appears in the above-identified patent and that said Letters Patent is hereby corrected as shown below:

Col. 10, line 8: replace "75 percentile" with --$75^{th}$ percentile--;
Col. 10, line 10: replace "deter mined" with --determined--;
Col. 7, line 35: replace "a data plots" with --a data plot--.

Signed and Sealed this
First Day of May, 2012

David J. Kappos
*Director of the United States Patent and Trademark Office*